G. W. JENNINGS.
Hand Mowing Machine.
No. 47,022.
Patented March 28, 1865.
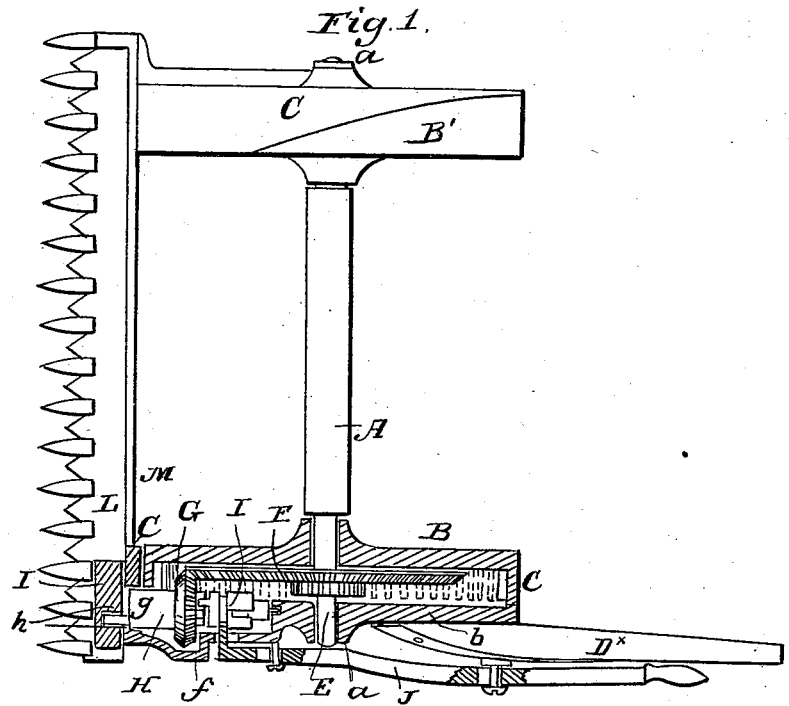
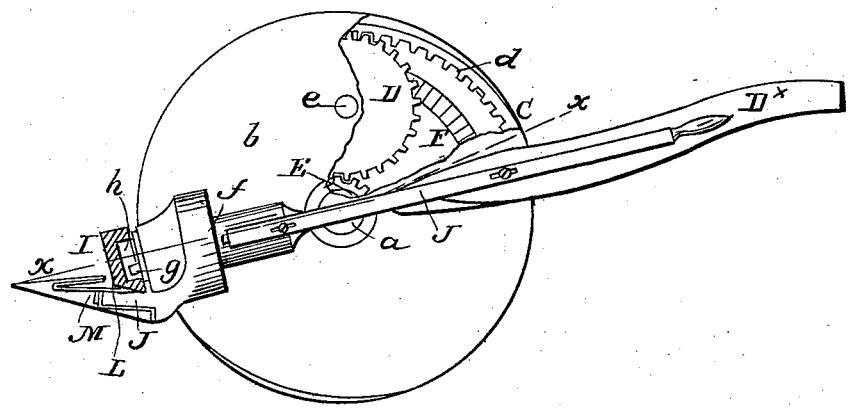
Witnesses:
Inventor:

UNITED STATES PATENT OFFICE.

G. W. JENNINGS, OF BOSTON, MASSACHUSETTS.

IMPROVEMENT IN HAND MOWING-MACHINES.

Specification forming part of Letters Patent No. 47,022, dated March 28, 1865.

*To all whom it may concern:*

Be it known that I, G. W. JENNINGS, of Boston, in the county of Suffolk and State of Massachusetts, have invented a new and Improved Hand Mowing-Machine; and I do hereby declare that the following is a full, clear, and exact description thereof, which will enable others skilled in the art to make and use the same, reference being had to the accompanying drawings, forming part of this specification, in which—

Figure 1 is a plan or top view of my invention, partly in section, as indicated by the line $x\,x$, Fig. 2. Fig. 2 is a side view of the same, partly in section.

Similar letters of reference indicate like parts.

This invention consists in a novel construction and arrangement of the sickle-driving mechanism, as hereinafter fully shown and described, whereby the gearing is fully covered and protected, a rapid motion of the sickle obtained by a very compact arrangement of parts, and the device placed under the complete control of the operator.

A represents an axle, having wheels B B placed loosely on its ends, and covered at their upper parts wholly or partially by caps C C, which are secured to the ends of the axle A by screws $a$, said caps being each provided with a handle, $D^\times$. The wheel B is hollow, the outer part being covered by a plate, which is permanently attached to the cap C of the wheel. The other wheel, B', may be similarly constructed; but it has no internal gearing. The wheel B is provided at the inner surface of its rim $c$ with teeth or cogs $d$, into which a pinion, D, gears, the latter having its axis $e$ secured to plate $b$. (See Fig. 2.) The pinion D also gears into another pinion, E, which is attached to or cast concentrically with a bevel-wheel, F, the latter being within wheel B and placed loosely on the axle A. The bevel-wheel F gears into a bevel-pinion, G, which is placed loosely on a shaft, H, the latter having its bearings in the plate $b$, and covered by a cap, $f$, which also covers the pinion G at the outer side of $b$. The pinion G is connected with the shaft H, when desired, by means of a toothed clutch, I; or a friction-clutch may be used instead, and I consider the latter preferable. This clutch is operated by a lever, J, at the outer side of plate $b$, and the handle $D^\times$, which is attached to it. The front end of the shaft H is provided with a crank-pin, $g$, which is fitted and works in a vertical slot, $h$, in an upright lug, $i$, at one end of the sickle-bar L, the sickle being placed upon the finger-bar M, which is secured by bolts to lips $j$ on the caps C.

From the above description it will be seen that when the machine is shoved along and the pinion G is connected to the shaft H a reciprocating movement will be communicated to the sickle, and it will be seen that a very rapid movement may be given it by a very compact arrangement of parts; and it will further be seen that the finger-bar and sickle may be moved upward or downward from the axle A as a center without in the least affecting the sickle-driving mechanism. The operator, therefore, will have full control over the implement, and may raise or depress the sickle to cut the grass high or low, as desired, or to pass over obstructions. The implement also may be manufactured at a moderate cost, and it contains no parts liable to become deranged by use. All the sickle-driving mechanism is fully covered and protected from dust, dirt, cut grass, and other substances which would have a tendency to choke or clog it and render breakage or a straining of the working parts probable.

I claim as new and desire to secure by Letters Patent—

1. The internal teeth, $d$, of the wheel B, the pinion D, and bevel-gears E F G, in connection with the crank-pin $g$ of shaft H, and the slotted lug $i$ on on the sickle-bar L, all arranged to operate in the manner substantially as and for the purpose set forth.

2. The caps C C on or over the wheels B B', with the finger-bar M and handles $D^\times$ attached thereto, substantially as described.

G. W. JENNINGS.

Witnesses:
WM. S. WEYMOUTH,
M. A. HOSKINS.